US009748580B2

(12) United States Patent
Ota et al.

(10) Patent No.: US 9,748,580 B2
(45) Date of Patent: Aug. 29, 2017

(54) OXYGEN REDUCTION CATALYST AND METHOD FOR PRODUCING THE SAME

(75) Inventors: Ken-ichiro Ota, Yokohama (JP); Akimitsu Isihara, Yokohama (JP); Shigenori Mitsushima, Yokohama (JP); Koichi Matsuzawa, Yokohama (JP); Keisuke Ukita, Yokohama (JP); Hideto Imai, Tokyo (JP); Masashi Matsumoto, Tokyo (JP); Takashi Miyazaki, Tokyo (JP)

(73) Assignee: Yokohama National University, Yokohama-shi, Kanagawa (JP)

( * ) Notice: Subject to any disclaimer, the term of this patent is extended or adjusted under 35 U.S.C. 154(b) by 255 days.

(21) Appl. No.: 14/005,795

(22) PCT Filed: Mar. 21, 2012

(86) PCT No.: PCT/JP2012/057189
§ 371 (c)(1),
(2), (4) Date: Sep. 17, 2013

(87) PCT Pub. No.: WO2012/128287
PCT Pub. Date: Sep. 27, 2012

(65) Prior Publication Data
US 2014/0011102 A1    Jan. 9, 2014

(30) Foreign Application Priority Data

Mar. 24, 2011 (JP) .................................. 2011-065846

(51) Int. Cl.
| H01M 4/00 | (2006.01) |
| H01M 8/02 | (2016.01) |
| H01M 4/90 | (2006.01) |
| H01M 4/86 | (2006.01) |
| B01J 37/34 | (2006.01) |
| B01J 21/18 | (2006.01) |
| B01J 23/16 | (2006.01) |
| B01J 23/20 | (2006.01) |
| B01J 27/22 | (2006.01) |
| B01J 27/24 | (2006.01) |
| B01J 23/18 | (2006.01) |

(52) U.S. Cl.
CPC ........... *H01M 4/9083* (2013.01); *B01J 21/18* (2013.01); *B01J 23/16* (2013.01); *B01J 23/20* (2013.01); *B01J 27/22* (2013.01); *B01J 27/24* (2013.01); *B01J 37/341* (2013.01); *H01M 4/8673* (2013.01); *H01M 4/9016* (2013.01); *B01J 23/18* (2013.01); *H01M 4/8657* (2013.01)

(58) Field of Classification Search
CPC .................................. H01M 4/00; H01M 8/02
See application file for complete search history.

(56) References Cited

U.S. PATENT DOCUMENTS

| 2007/0105007 A1* | 5/2007 | Regalbuto ........................ 429/44 |
| 2010/0216050 A1* | 8/2010 | Matsui et al. ................. 429/483 |
| 2011/0034325 A1 | 2/2011 | Catanorchi et al. |
| 2012/0003548 A1 | 1/2012 | Shishikura |
| 2012/0083407 A1* | 4/2012 | Shishikura .............. C01B 31/04 502/171 |

FOREIGN PATENT DOCUMENTS

| CN | 101259437 A | 9/2008 |
| JP | 2005-281057 A | 10/2005 |
| JP | 2009-148706 A | 7/2009 |
| JP | 2009-226311 | * 10/2009 |
| JP | 2010-167390 A | 8/2010 |
| JP | 2010-270107 A | 12/2010 |
| JP | 2011/040060 A1 | 4/2011 |
| JP | 2011-194328 A | 10/2011 |
| JP | 2011-198636 A | 10/2011 |
| JP | 2011-240242 A | 12/2011 |
| JP | 2012-017490 A | 1/2012 |
| WO | 2009/025176 A1 | 2/2009 |
| WO | 2009/060777 A1 | 5/2009 |
| WO | WO 2009/075037 | * 6/2009 |
| WO | WO 2010/107028 | 9/2010 |
| WO | 2010/126020 A1 | 11/2010 |
| WO | 2011/001717 A1 | 1/2011 |
| WO | 2011/007790 A1 | 1/2011 |
| WO | 2011/040059 A1 | 4/2011 |

OTHER PUBLICATIONS

Office Action issued Oct. 8, 2014 in corresponding CN Application No. 201280014393.0.
Imai, Hideto, et al., Structural defects working as active oxygen-reduction sites in partially oxidized Ta-carbonitride core-shell particles probed by using surface-sensitive conversion-electron-yield x-ray absorption spectroscopy, Applied Physics Letters, 2010, pp. 191905-1-191905-3; vol. 96, American Institute of Physics, USA.
Ishihara, A., et al., Partially oxidized tantalum cabonitrides as a new nonplatinum cathode for PEFC-1-, Journal of the Electrochemical Society, 2008, pp. B400-B406, vol. 155, The Electrochemical Society.

(Continued)

*Primary Examiner* — Jacob Marks
(74) *Attorney, Agent, or Firm* — Knobbe, Martens, Olson & Bear, LLP (57) ABSTRACT

Provided is an oxygen reduction catalyst having a high oxygen reduction performance. An oxygen reduction catalyst according to the present embodiment includes a transition metal oxide to which an oxygen defect is introduced, and a layer that is provided on the transition metal oxide and that contains an electron conductive substance. A method for producing an oxygen reduction catalyst according to the present embodiment includes heating a transition metal carbonitride as a starting material in an oxygen-containing mixed gas. In addition, a method for producing an oxygen reduction catalyst according to the present embodiment includes heating a transition-metal phthalocyanine and a carbon fiber powder as starting materials in an oxygen-containing mixed gas.

11 Claims, 1 Drawing Sheet

(56) References Cited

OTHER PUBLICATIONS

Ishihara, A., et al., Tantalum oxynitride for a novel cathode of PEFC; Electrochemical and Solid-State Letters, 2005, pp. A201-A203, vol. 8, The Electrochemical Society.
Tamura, M., et al., Catalytic activity of partially oxidized tantalum carbonitride for oxygen reduction reaction; Fall Meeting of Electrochemical Society, Abstracts, p. 12, 2007, Japan.
Lee, K., et al, Stability and electrocatalytic activity for oxygen reduction in WC + Ta catalyst, Electrochimica Acta, May 7, 2004, pp. 3479-3485, vol. 49, Elsevier Ltd.
Akimitsu Ishihara, et al., Progress in non-precious metal oxide-based cathode for polymer electrolyte fuel cells; Electrochimica Acta; Chemical Energy Laboratory, Yokohama National University, Japan, journal homepage: www.elsevier.com/locate/electacta; pp. 1-8.
Ken-Ichiro Ota, et al., Development of group 4 and 5 metal oxide-based cathodes for polymer electrolyte fuel cell; Journal of Power Sources; Chemical Energy Laboratory, Yokohama National University, Japan, journal homepage: www.elsevier.com/locate/jpowsour.

* cited by examiner

OXYGEN REDUCTION CATALYST AND METHOD FOR PRODUCING THE SAME

CROSS-REFERENCE TO RELATED APPLICATIONS

This application is the U.S. National Phase under 35. U.S.C. §371 of International Application PCT/JP2012/057189, filed Mar. 21, 2012, which claims priority to Japanese Patent Application No. 2011-065846, filed Mar. 24, 2011. The disclosures of the above-described applications are hereby incorporated by reference in their entirety. The International Application was published under PCT Article 21(2) in a language other than English.

TECHNICAL FIELD

The present embodiment relates to an oxygen reduction catalyst for promoting an oxygen reduction reaction in an aqueous solution. In particular, it relates to an oxygen reduction catalyst for use in an air electrode for electrochemical devices such as a fuel cell and an air battery, and a method for producing the same.

BACKGROUND ART

Fuel cells and air batteries are electrochemical energy devices in which energy generated by a chemical reaction of a compound serving as a fuel with a negative electrode active material is extracted as electric energy using oxygen in the air as an oxidant. Fuel cells and air batteries have a higher theoretical energy content than secondary batteries such as a Li ion battery, and can be utilized for in-vehicle power sources, stationary-type power sources in homes, factories, and the like, power sources for mobile electronic equipment, and the like.

An electrochemical reaction in which oxygen is reduced occurs at the oxygen electrode side in a fuel cell and an air battery. An oxygen reduction reaction hardly progresses at a relatively low temperature and can be generally promoted by a noble metal catalyst such as platinum (Pt). However, the energy conversion efficiencies of a fuel cell and an air battery have not been sufficient yet. In addition, since an oxygen reduction reaction occurs in a high potential region, it causes even a noble metal such as Pt to be dissolved and degraded, resulting in problems of long-term stability and securing of reliability. Furthermore, a catalyst containing a noble metal such as Pt as a main component is expensive, thereby driving up the costs of a fuel cell and an air battery as the whole system to prevent such batteries from becoming widespread. Accordingly, there is a demand for developing a catalyst that is inexpensive with no use of a noble metal such as platinum and that has a high oxygen reduction capacity.

As a catalyst not containing Pt, an organic metal complex, carbon nitride, a transition metal chalcogenide, a transition metal carbonitride, a transition metal nitride, and the like are known, but all of them are insufficient in terms of catalyst activity and durability, and do not achieve a higher performance than Pt-based catalysts.

Non Patent Literatures 1 and 2 disclose that some of oxides of transition metals, Group IV and V elements, inter alia, have an activity to an oxygen reduction reaction. In addition, Non Patent Literature 3 and Patent Literature 1 point out a possibility in which a structure defect partially serves as an active point of an oxygen reduction reaction. Furthermore, Non Patent Literatures 4 and 5, and Patent Literature 1 disclose that electron conductive carbon and the like are added at the time of making up an electrode.

CITATION LIST

Patent Literature

Patent Literature 1: JP2009-148706A

Non Patent Literatures

Non Patent Literature 1: K Lee, et al., Electrochim. Acta, 49, 3479 (2004)
Non Patent Literature 2: A. Ishihara, et al., Electrochem. Solid-State Lett., 8, A201 (2005)
Non Patent Literature 3: H. Imai et al., APPLIED PHYSICS LETTERS 96, 191905 2010
Non Patent Literature 4: Fall Meeting of Electrochemical Society, Abstracts, p. 12 (2007)
Non Patent Literature 5: Journal of The Electrochemical Society, 155 (4), 6400-B406 (2008)

SUMMARY OF INVENTION

Technical Problem

Since the oxygen reduction reaction on an air electrode catalyst of each of a fuel cell and an air battery is a reaction involving electron transfer from an electrode, an electron is required to rapidly transfer from the electrode to the vicinity of a reaction active point on the catalyst in order to achieve a favorable oxygen reduction catalyst performance. In addition, oxygen and a proton being reactants are required to be rapidly delivered to the reaction active point.

However, the oxides of transition metals, Group IV and V elements, described in Non Patent Literatures 1 to 3, and Patent Literature 1 generally have an electron state like an insulator, and thus are poor in electron conductivity and are difficult to react rapidly. Therefore, there is a problem in that while such oxides exhibit a relatively high performance in the case where batteries are operated at a low current value, the operating voltage is reduced in a high current region.

Also in the methods described in Non Patent Literatures 4 and 5, and Patent Literature 1, an effective electron-conduction path is difficult to build up and control in the vicinity of the active point at a nanometer level, and thus performance remains at a low level. In addition, a large amount of conductive carbon is introduced to thereby inhibit the supply of oxygen to the catalyst active point, and thus there is a need for simultaneously satisfying the imparting of electron conductivity and the efficient transport of oxygen to thereby enhance oxygen reduction performance.

Thus, in the case where the transition metal oxide is used for an oxygen reduction catalyst, there are problems in terms of the electron conductivity and oxygen diffusion property on the catalyst surface, and oxygen reducing ability remains at a low level. Therefore, there is room for further improvement in enhancing the performance.

An object of the present embodiment is to provide an oxygen reduction catalyst having a high oxygen reduction performance.

Solution to Problem

An oxygen reduction catalyst according to the present embodiment contains a transition metal oxide to which an oxygen defect is introduced, and a layer that is provided on the transition metal oxide and that contains an electron conductive substance.

A method for producing an oxygen reduction catalyst according to the present embodiment includes heating a transition metal carbonitride as a starting material in an oxygen-containing mixed gas.

A method for producing an oxygen reduction catalyst according to the present embodiment includes heating a transition-metal phthalocyanine and a carbon fiber powder as starting materials in an oxygen-containing mixed gas.

Advantageous Effects of Invention

According to the present embodiment, an oxygen reduction catalyst having a high oxygen reduction performance can be provided.

DESCRIPTION OF EMBODIMENTS

An oxygen reduction catalyst according to the present embodiment contains a transition metal oxide to which an oxygen defect is introduced, and a layer that is provided on the transition metal oxide and that contains an electron conductive substance.

In the present embodiment, with respect to a platinum alternative oxygen reduction catalyst containing a transition metal oxide, an oxygen defect is introduced into the transition metal oxide, or an oxygen defect is introduced into the transition metal oxide and oxygen atoms are partially replaced with nitrogen atoms, thereby making it possible to enhance the electron conductivity of the surface. In addition, an electron conductive substance such as conductive carbon or oxide is disposed in the vicinity of a structure defect serving as an active point of an oxygen reduction reaction to introduce a favorable conduction path, thereby making it possible to enhance oxygen reduction performance. Furthermore, carbon atoms of carbon for forming a conduction passage are partially replaced with nitrogen atoms and other element is introduced, thereby making it possible to enhance electron conductivity and also to increase oxygen affinity and oxygen diffusion property at the same time, and to enhance oxygen reduction performance. The oxygen reduction catalyst according to the present embodiment can be used to thereby prevent the reduction in voltage in a high current region, which has been a problem of a transition metal oxide-based catalyst in electrochemical power generation devices, in which oxygen is used as an oxidant, such as a fuel cell and an air battery, and to provide a high performance device. In addition, it is possible to realize the enhancement in durability and produce a device at a low cost.

The active point of an oxygen reduction reaction is introduced by introducing an oxygen deficiency site on the surface of the transition metal oxide. The surface of the transition metal oxide is poor in electron conductivity and does not allow an oxygen reduction reaction involving electron transfer to efficiently progress as it is.

As the method for allowing an oxygen reduction reaction involving electron transfer to efficiently progress in such a surface having a low electron conductivity, the following three methods are considered. (1) A first method is a method in which the active point density of an oxygen reduction is increased to shorten the electron-conduction path length per unit active point. (2) A second method is a method in which a defect (sometimes serving as an active point) is generated on the surface and the surface is subjected to element substitution to thereby generate intermediate levels in the band gap of an electrically insulating oxide, and an electron is conducted between the levels to thereby increase the electron conductivity of the surface. (3) A third method is a method in which the vicinity of the active point is covered with an electron conductive substance to serve as a contact point with an electrode material, thereby enhancing the electron conductivity.

In the present embodiment, an oxygen defect is introduced into the transition metal oxide, thereby (1) increasing the active point density and (2) increasing the electron conductivity of the surface. In addition, the layer containing an electron conductive substance is provided on the transition metal oxide to cover the vicinity of an oxygen defect with the electron conductive substance, thereby (3) enhancing electron conductivity.

The amount of oxygen defect in the transition metal oxide is preferably 1 to 10 atm %. If the amount of oxygen defect is 10 atm % or less, the change in structure is not induced. The method for introducing an oxygen defect includes a heat treatment method in vacuum, a method in which a transition metal carbide, a transition metal carbonitride, and the like are heat-treated under a low oxygen partial pressure by using CO gas or a $CO/CO_2$ mixed gas, a method in which a substance that forms a reduction atmosphere by thermolysis, such as carbon, salicylic acid, oxalic acid, citric acid, malic acid, polyvinyl alcohol, glycolic acid, glucose, fructose, or sucrose is mixed with a transition metal oxide, a transition-metal phthalocyanine, or the like, and the mixture is heat-treated, and a method in which oxygen atoms are partially replaced with nitrogen atoms, described below. The amount of oxygen defect is more preferably 2 to 5 atm %. Herein, the amount of oxygen defect can be calculated by elemental analysis with the inert gas fusion infrared absorption method, and thus the presence or absence of an oxygen defect can also be determined.

The layer containing an electron conductive substance does not necessarily cover the transition metal oxide completely, and may cover at least a part thereof. The coverage with the layer containing an electron conductive substance is preferably 0.1 to 70%. The coverage can be 0.1% or more to thereby perform electron transfer efficiently. The coverage can be 70% or less to thereby deliver oxygen to the active point sufficiently to achieve an effective active point density. The coverage is more preferably 5 to 30%. Herein, the coverage can be measured by observing the cross section of the catalyst by TEM (transmission electron microscope). The layer containing an electron conductive substance is not necessarily layered, and may contain an electron conductive substance present on the transition metal oxide. For example, the layer may also contain an electron conductive substance present on the transition metal oxide in the dispersed state.

In the present embodiment, it is preferable that an oxygen defect be introduced into the transition metal oxide and oxygen atoms be partially replaced with nitrogen atoms from the viewpoints of (1) increasing the active point density and (2) increasing the electron conductivity of the surface. An oxygen atom to be replaced with a nitrogen atom is preferably an oxygen atom present on the surface of the transition metal oxide.

Examples of a method for partially replacing oxygen atoms of the transition metal oxide with nitrogen atoms include a method in which the transition metal oxide is heat-treated in a nitrogen stream, a method in which the transition metal oxide is heat-treated in an ammonia stream, and a method in which urea, melamine, pyrazine, purine, bipyridine, acetanilide, or piperazine, which generates ammonia by thermolysis, is mixed with the transition metal oxide in advance, and the mixture is heat-treated. A nitrogen atom incorporated in the transition metal oxide has an effect of changing the electron state of the transition metal oxide to stabilize an oxygen defect.

A transition metal in the transition metal oxide is preferably a Group IV or V element, and is preferably, for example, at least one element selected from the group consisting of Ti, Zr, Nb and Ta.

In addition, a transition metal in the transition metal oxide is preferably partially replaced with at least one element that is other than the transition metal and that is selected from the group consisting of Ti, V, Cr, Mn, Fe, Co, Zr, Nb, Mo, Ru, Pd, Hf, Ta and W from the viewpoint of making it possible to increase the oxygen defect density.

As the method for synthesizing the transition metal oxide partially replaced with the element, a general solid reaction method in which respective oxides are mixed for synthesis, a solution co-precipitation method in which an inorganic complex is used, a method in which an organic metal complex is reacted with a metal, or the like can be used.

Thus, the introduced oxygen defect and substitution element allow intermediate levels to be formed in the band gap of an insulating oxide, thereby having a role of not only stabilizing an oxygen defect but also creating local electron conduction. This can increase the electron conductivity of the transition metal oxide surface to enhance the activity of an oxygen reduction reaction.

The size of the transition metal oxide is preferably small in order to make a reaction surface area larger, and is preferably, for example, in the range from 1 nm to 100 nm.

The electron conductive substance is not particularly limited as long as it is a substance having electron conductivity, but is preferably a substance in which carbon is replaced or partially replaced with nitrogen. The vicinity of the active point on the transition metal oxide surface is covered with the substance in which carbon is replaced or partially replaced with nitrogen, thereby enhancing electron conductivity and increasing oxygen reduction activity.

As the method for covering carbon, a method in which a transition metal carbide or a transition metal carbonitride is heated in an oxygen-containing mixed gas to deposit fine carbon, a method in which a transition metal carbide or a transition metal carbonitride, a transition metal oxide, and a carbon source are heat-treated in a CO gas stream or a $CO/CO_2$ mixed stream to thereby create the co-existence state of the transition metal carbide or the transition metal carbonitride, the transition metal oxide, the carbon source, and CO and $CO_2$, to deposit carbon on the transition metal oxide surface, a method in which an appropriate carbon source is used to deposit carbon by the chemical vapor deposition method, a method in which an organic substance is decomposed by hydrothermal synthesis or the like to deposit carbon, or the like can be used.

In general, in the case where the surface is covered with the electron conductive substance, the number of oxygen reduction sites is decreased and also oxygen adsorption ability of a surface oxide is deteriorated. Therefore, the electron conductive substance preferably has oxygen adsorption ability. In the present embodiment, as a method for enhancing oxygen adsorption ability, a method in which carbon as the electron conductive substance is partially replaced with nitrogen atoms, or a method in which a substance, in which carbon is partially replaced with nitrogen, is allowed to contain at least one element selected from the group consisting of Ti, V, Cr, Mn, Fe, Co, Zr, Nb, Mo, Ru, Pd, Hf, Ta and W can be used. The phrase "a substance, in which carbon is partially replaced with nitrogen, is allowed to contain the element" means that the substance may contain a simple substance, oxide, carbide, nitride, and the like of the element.

As the method for partially nitriding carbon, a method in which the deposited carbon is heat-treated in a nitrogen stream or a method in which the deposited carbon is heat-treated in an ammonia stream can be used. A method in which a substance containing carbon and nitrogen is mixed and pyrolyzed can also be used. As a carbon source, in addition to a carbon simple substance such as carbon containing a graphite component, carbon having a diamond structure, amorphous carbon, fullerene, and carbon nanotube, a carbon six-membered ring compound such as benzene, naphthalene, or anthracene, or a derivative or polymer thereof can be used. As a carbon source and a nitrogen source, a hetero 5-membered ring compound containing carbon and nitrogen, such as pyrrole, imidazole, pyrazole, tellurazole, isotellurazole, selenazole, isoselenazole, thiozole, thiazole, isothiazole, oxazole, isoxazole, furazan, or triazole, or a derivative or polymer thereof, a hetero 6-membered ring compound containing carbon and nitrogen, such as quinazoline, isoquinoline, quinoline, naphthyridine, acridine, benzoquinoline, phenanthroline, quinoxaline, indole, indoline, indazole, carbazole, benzothiazole, benzimidazole, or pyrrolopyridine, or a derivative or polymer thereof, or an organic substance containing carbon and nitrogen, such as phthalocyanine or porphyrin, or a derivative thereof, or the like can be used. These may be used alone or in combination of two or more thereof. For example, a method in which a transition-metal phthalocyanine and a carbon fiber powder are mixed, and heated in the presence of oxygen gas may also be used.

As the method in which the substance, in which carbon is partially replaced with nitrogen, is allowed to contain at least one element selected from the group consisting of Ti, V, Cr, Mn, Fe, Co, Zr, Nb, Mo, Ru, Pd, Hf, Ta and W, a method in which a compound containing an element for substitution is used for synthesis in a heating manner or in a wet manner may be used. The compound containing an element for substitution includes an organic metal complex. Examples of the organic metal complex include iron phthalocyanine, ferrocene, and iron porphyrin, in the case where Fe is contained. For example, carbon can be mixed with the organic metal complex containing an element for substitution and the mixture can be decomposed by pyrolysis, a mechanical milling method, or the like to thereby provide the desired oxygen reduction catalyst. Such a reaction may be performed in combination with the above nitridation.

The electron conductive substance is preferably an electron conductive oxide containing at least one element that is other than the transition metal of the transition metal oxide and that is selected from the group consisting of Ti, Cr, Mn, Ni, Co, Fe, Cu, Zr, Nb, Mo, Ru, Ta and W.

The method for disposing the electron conductive oxide on the surface of the transition metal oxide includes a method in which the oxide is co-precipitated with a material having self-phase separation property, a chemical vapor transport method, and a sputtering method. In order to increase electron conductivity, a method in which an oxygen defect is introduced in a reduction atmosphere, or an alloying method can also be used. Such a method can also be performed at the same time as the production of a catalyst particle. The electron conductive oxide may also be partially nitrided by the above-described method in which carbon is partially nitrided.

In the case where the electron conductive substance is a substance in which carbon is replaced or partially replaced with nitrogen, or an electron conductive oxide, the primary particle size thereof is preferably 0.5 nm to 20 nm. Herein, a mixture in which fine carbon and carbon having a larger particle size than the fine carbon are mixed can also be used as the carbon source.

As the electron conductive substance, a noble metal such as Au or Pt, or an electrically-conductive organic substance can also be used. In the case where a noble metal such as Au or Pt is used as the electron conductive substance, a complex precipitation method, a method in which the organic metal complex is adsorbed and pyrolyzed, a sputtering method, or the like can be used as the method for covering the transition metal oxide with the layer containing an electron conductive substance.

Herein, the electron conductive substance can be used alone or as a mixture of a plurality of substances.

An air electrode containing the oxygen reduction catalyst according to the present embodiment can be used for a fuel cell and an air battery. As an electrolytic solution for the fuel cell, an electrolytic solution having any property of an acidic solution, an alkali solution, a neutral solution, and an organic solvent can be used. A fuel for the fuel cell is not particularly limited, and hydrogen, methanol, a hydrogen compound, or the like can be used therefor. An electrolytic solution and a negative electrode active material are not particularly limited also in the case of the air battery. The air electrode can also be utilized as an air electrode of a Li-air battery in which a substance containing Li is used as a negative electrode.

A method for producing an oxygen reduction catalyst according to the present embodiment includes heating a transition metal carbonitride as a starting material in an oxygen-containing mixed gas. In addition, a method for producing an oxygen reduction catalyst according to the present embodiment includes heating a transition-metal phthalocyanine and a carbon fiber powder as starting materials in an oxygen-containing mixed gas.

EXAMPLES

Hereinafter, the present embodiment will be specifically described in detail in Examples.

Example 1

Tantalum carbonitride ($TaC_{0.5}N_{0.5}$) having a particle size of about 1 μm was introduced into a rotating electric furnace (rotary kiln). It was kept in a mixed gas of carbon monoxide gas (diluted with nitrogen as a carrier gas to 2% by volume) and oxygen gas (diluted with nitrogen as a carrier gas to 2% by volume) at 1000° C. for 10 hours to synthesize an oxygen reduction catalyst being a mixture of tantalum oxide and carbon.

It was confirmed from powder X-ray diffraction measurement that an oxide phase having a b-$Ta_2O_5$ structure was formed. The amount of oxygen defect was estimated by elemental analysis with the inert gas fusion infrared absorption method, and the amount of oxygen defect was found to be about 4 atm % (hereinafter, designated as %).

The cross section of the catalyst was observed by TEM to find out that fine carbon having a slightly grown graphite structure on the surface thereof was deposited. The average primary particle size was 6 nm. The coverage of the surface with carbon was presumed from a TEM image to be about 10%.

Example 2

A part of the oxygen reduction catalyst synthesized in Example 1 was kept in an ammonia stream at 670° C. for 3 hours to synthesize an oxygen reduction catalyst in which oxygen atoms of tantalum oxide and carbon atoms of carbon were each partially replaced with nitrogen atoms. It was confirmed from powder X-ray diffraction measurement that the oxide phase having a b-$Ta_2O_5$ structure was maintained. Herein, the diffraction angle was found to be shifted to a lower angle. The core level spectrum of Ta 4f was observed by X-ray photoelectron spectroscopy (XPS) using Al Kα monochromatic light, and a shift to the low energy side was seen and thus oxygen atoms were confirmed to be partially replaced with nitrogen atoms. Also with respect to the core level spectrum of C 1s, such a peak shift that carbon atoms could be confirmed to be partially replaced with nitrogen atoms was observed.

Comparative Example 1

Tantalum carbonitride ($TaC_{0.5}N_{0.5}$) having a particle size of about 1 μm was introduced into a rotating electric furnace (rotary kiln). It was kept in oxygen gas (diluted with nitrogen as a carrier gas to 2% by volume) at 1000° C. for 6 hours to synthesize an oxygen reduction catalyst being tantalum oxide.

It was confirmed from powder X-ray diffraction measurement that an oxide phase having a b-$Ta_2O_5$ structure was formed. The amount of oxygen defect was estimated in the same manner as in Example 1, and the amount of oxygen defect was found to be about 3.8%. The cross section of the catalyst was observed by TEM, and the deposition of carbon was not confirmed.

(Oxygen Reduction Capacity Evaluation)

Each of the oxygen reduction catalysts synthesized in Example 1, Example 2 and Comparative Example 1 was used for a cathode catalyst to make up a single cell. The cathode catalyst, Ketjenblack (registered trademark), and a Nafion (registered trademark) solution were mixed to prepare a paste-like ink, and the ink was applied on a cathode current collection electrode to thereby form a catalyst electrode and a gas diffusion layer. A platinum ruthenium alloy was used for an anode catalyst. Pure hydrogen and pure oxygen were supplied to an anode and a cathode, respectively, to measure a current-voltage curve. The results are shown in FIG. 1.

Figure 1:
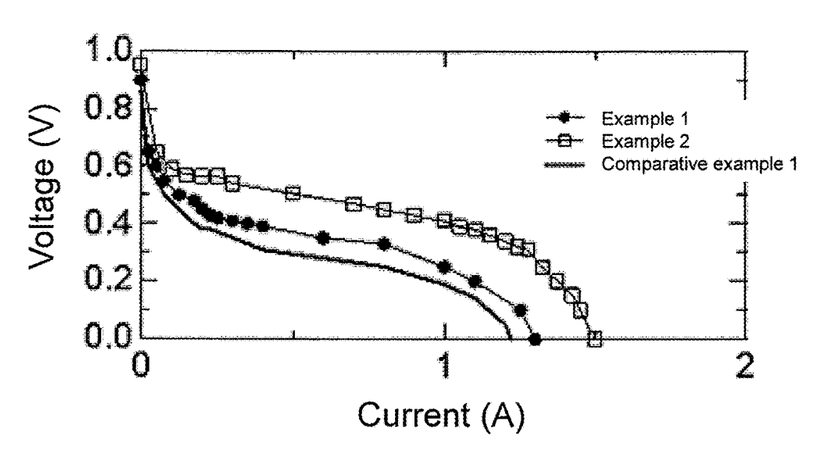
FIG. 1 is a graph showing a current-voltage curve when oxygen reduction capacity evaluations in Examples 1 and 2, and Comparative Example 1 are performed.

As is clear from FIG. 1, the rise of an open circuit terminal voltage corresponding to an on-set potential for oxygen reduction and the increase in limiting current density were confirmed in the oxygen reduction catalysts synthesized in Example 1 and Example 2, as compared with that synthesized in Comparative Example 1. The rise of an open circuit voltage is considered to be mainly due to the enhancement in electron conductivity of the surface. In addition, the increase in limiting current density is considered to be due to the enhancement in electron conductivity, and the enhancement in fuel supply, namely, oxygen diffusibility.

Example 3

Ti metal was sputtered on the surface of the oxygen reduction catalyst synthesized in Comparative Example 1, and kept in a mixed gas of hydrogen gas (diluted with nitrogen as a carrier gas to 2% by volume) and oxygen gas (diluted with nitrogen as a carrier gas to 2% by volume) at 1000° C. for 10 hours. Thus, an oxygen reduction catalyst being tantalum oxide whose surface was partially covered with $TiO_x$ was synthesized.

Example 4

An oxygen reduction catalyst being tantalum oxide whose surface was partially covered with $NbO_x$ was synthesized in the same manner as in Example 3 except that Nb metal was sputtered instead of Ti metal.

Example 5

An oxygen reduction catalyst being tantalum oxide whose surface was partially covered with $NbFeO_x$ was synthesized in the same manner as in Example 3 except that a NbFe alloy was sputtered instead of Ti metal.

Example 6

The oxygen reduction catalyst synthesized in Example 3 was kept in an ammonia stream at 670° C. for 3 hours to synthesize an oxygen reduction catalyst in which oxygen atoms were partially replaced with nitrogen atoms. It was confirmed by the same manner as in Example 2 that oxygen atoms were partially replaced with nitrogen atoms.

Example 7

The oxygen reduction catalyst synthesized in Example 4 was kept in an ammonia stream at 670° C. for 3 hours to synthesize an oxygen reduction catalyst in which oxygen atoms were partially replaced with nitrogen atoms. It was confirmed by the same manner as in Example 2 that oxygen atoms were partially replaced with nitrogen atoms.

Example 8

The oxygen reduction catalyst synthesized in Example 5 was kept in an ammonia stream at 670° C. for 3 hours to synthesize an oxygen reduction catalyst in which oxygen atoms were partially replaced with nitrogen atoms. It was confirmed by the same manner as in Example 2 that oxygen atoms were partially replaced with nitrogen atoms.

Example 9

Pentaethoxy tantalum, ethanol, and Ketjenblack (registered trademark) were kneaded. Thereafter, the mixture was introduced into a rotating electric furnace (rotary kiln), and kept in a mixed gas of carbon monoxide gas (diluted with nitrogen as a carrier gas to 2% by volume) and oxygen gas (diluted with nitrogen as a carrier gas to 2% by volume) at 1000° C. for 10 hours. Thus, an oxygen reduction catalyst being a mixture of tantalum oxide and carbon was synthesized.

The same elemental analysis as in Example 1 was performed, and it was confirmed that an oxygen defect was present on tantalum oxide. In addition, the cross section of the catalyst was observed by TEM, and it was confirmed that carbon was present on the surface of tantalum oxide.

Example 10

An oxygen reduction catalyst being a mixture of niobium oxide and carbon was synthesized in the same manner as in Example 9 except that pentaethoxy niobium was used instead of pentaethoxy tantalum.

The same elemental analysis as in Example 1 was performed, and it was confirmed that an oxygen defect was present on niobium oxide. In addition, the cross section of the catalyst was observed by TEM, and it was confirmed that carbon was present on the surface of niobium oxide.

Example 11

The oxygen reduction catalyst synthesized in Example 9 was kept in an ammonia stream at 670° C. for 3 hours to synthesize an oxygen reduction catalyst in which oxygen atoms of tantalum oxide and carbon atoms of carbon were each partially replaced with nitrogen atoms. It was confirmed by the same manner as in Example 2 that oxygen atoms and carbon atoms were each partially replaced with nitrogen atoms.

Example 12

The oxygen reduction catalyst synthesized in Example 10 was kept in an ammonia stream at 670° C. for 3 hours to synthesize an oxygen reduction catalyst in which oxygen atoms of niobium oxide and carbon atoms of carbon were each partially replaced with nitrogen atoms. It was confirmed by the same manner as in Example 2 that oxygen atoms and carbon atoms were each partially replaced with nitrogen atoms.

Example 13

A paste obtained by kneading pentaethoxy tantalum, ethanol, and Ketjenblack (registered trademark) was further mixed with iron phthalocyanine. Thereafter, the mixture was introduced into a rotating electric furnace (rotary kiln), and kept in oxygen gas (diluted with nitrogen as a carrier gas to 2% by volume) at 1000° C. for 10 hours. Thus, an oxygen reduction catalyst being a mixture of tantalum oxide and carbon was synthesized.

The same elemental analysis as in Example 1 was performed, and it was confirmed that an oxygen defect was present on tantalum oxide. In addition, the cross section of the catalyst was observed by TEM, and it was confirmed that carbon was present on the surface of tantalum oxide. Furthermore, it was confirmed by the same manner as in Example 2 that carbon atoms were partially replaced with nitrogen atoms.

Example 14

An oxygen reduction catalyst being a mixture of niobium oxide and carbon was synthesized in the same manner as in Example 13 except that pentaethoxy niobium was used instead of pentaethoxy tantalum.

The same elemental analysis as in Example 1 was performed, and it was confirmed that an oxygen defect was present on niobium oxide. In addition, the cross section of the catalyst was observed by TEM, and it was confirmed that carbon was present on the surface of niobium oxide. Furthermore, it was confirmed by the same manner as in Example 2 that carbon atoms were partially replaced with nitrogen atoms.

Example 15

$TiO_2$ was mixed with 10% by mass of fullerene, and the mixture was pulverized by a mortar and then formed into a pellet. The pellet was introduced into a rotating electric furnace (rotary kiln), and kept in oxygen gas (diluted with nitrogen as a carrier gas to 2% by volume) at 1000° C. for 6 hours. Thus, an oxygen reduction catalyst being a mixture of titanium oxide and carbon was synthesized.

The same elemental analysis as in Example 1 was performed, and it was confirmed that an oxygen defect was present on titanium oxide. In addition, the cross section of the catalyst was observed by TEM, and it was confirmed that carbon was present on the surface of titanium oxide.

Example 16

An oxygen reduction catalyst being a mixture of zirconium oxide and carbon was synthesized in the same manner as in Example 15 except that $ZrO_2$ was used instead of $TiO_2$.

The same elemental analysis as in Example 1 was performed, and it was confirmed that an oxygen defect was present on zirconium oxide. In addition, the cross section of the catalyst was observed by TEM, and it was confirmed that carbon was present on the surface of zirconium oxide.

Example 17

$TiO_2$ was mixed with 10% by mass of iron phthalocyanine, and the mixture was pulverized by a mortar and then formed into a pellet. The pellet was introduced into a rotating electric furnace (rotary kiln), and kept in oxygen gas (diluted with nitrogen as a carrier gas to 2% by volume) at 1000° C. for 6 hours. Thus, an oxygen reduction catalyst being a mixture of titanium oxide and carbon was synthesized.

The same elemental analysis as in Example 1 was performed, and it was confirmed that an oxygen defect was present on titanium oxide. In addition, the cross section of the catalyst was observed by TEM, and it was confirmed that carbon was present on the surface of titanium oxide. Furthermore, it was confirmed by the same manner as in Example 2 that carbon atoms were partially replaced with nitrogen atoms.

Example 18

An oxygen reduction catalyst being a mixture of zirconium oxide and carbon was synthesized in the same manner as in Example 17 except that $ZrO_2$ was used instead of $TiO_2$.

The same elemental analysis as in Example 1 was performed, and it was confirmed that an oxygen defect was present on zirconium oxide. In addition, the cross section of the catalyst was observed by TEM, and it was confirmed that carbon was present on the surface of zirconium oxide. Furthermore, it was confirmed by the same manner as in Example 2 that carbon atoms were partially replaced with nitrogen atoms.

Example 19

$ZrCl_4$ and phthalonitrile were mixed, and then heated at 180° C. to synthesize Zr phthalocyanine. The synthesized Zr phthalocyanine was mixed with salicylic acid, citric acid and Ketjenblack (registered trademark), and the mixture was introduced into a rotating electric furnace (rotary kiln). The mixture was kept in a mixed gas of hydrogen gas (diluted with nitrogen as a carrier gas to 2% by volume) and oxygen gas (diluted with nitrogen as a carrier gas to 2% by volume) at 800° C. for 3 hours. Thus, an oxygen reduction catalyst being a mixture of zirconium oxide and carbon was synthesized.

The same elemental analysis as in Example 1 was performed, and it was confirmed that an oxygen defect was present on zirconium oxide. The average particle size was 10 nm from observation by TEM. In addition, a compound of carbon and nitrogen was highly dispersed on the surface of zirconium oxide, and the coverage was about 10%. Furthermore, it was confirmed by the same manner as in Example 2 that carbon atoms were partially replaced with nitrogen atoms.

Example 20

$ZrCl_4$ and phthalonitrile were mixed, and then heated at 180° C. to synthesize Zr phthalocyanine. The synthesized Zr phthalocyanine was mixed with salicylic acid, citric acid and Ketjenblack (registered trademark), and the mixture was introduced into a rotating electric furnace (rotary kiln). The mixture was kept in oxygen gas (diluted with nitrogen as a carrier gas to 2% by volume) at 900° C. for 1 hour. Thus, an oxygen reduction catalyst being a mixture of zirconium oxide and carbon was synthesized.

The same elemental analysis as in Example 1 was performed, and it was confirmed that an oxygen defect was present on zirconium oxide. The average particle size was 10 nm from observation by TEM. In addition, carbon not containing nitrogen was highly dispersed on the surface of zirconium oxide, and the coverage was about 10%.

Example 21

$TiCl_4$ and phthalonitrile were mixed, and then heated at 180° C. to synthesize Ti phthalocyanine. The synthesized Ti phthalocyanine was mixed with salicylic acid and a fine carbon fiber powder, and the mixture was introduced into a rotating electric furnace (rotary kiln). The mixture was kept in a nitrogen gas atmosphere at 900° C. for 1 hour. Thus, an oxygen reduction catalyst being a mixture of titanium oxide and carbon was synthesized.

The same elemental analysis as in Example 1 was performed, and it was confirmed that an oxygen defect was present on titanium oxide. The average particle size was 10 nm from observation by TEM. In addition, a substance in which carbon was partially replaced with nitrogen was highly dispersed on the surface of titanium oxide, and the coverage was about 10%.

Example 22

Nb phthalocyanine was mixed with salicylic acid and a fine carbon fiber powder, and subjected to thermolysis in an electric furnace having an oxygen-free reduction atmosphere at 800° C. for 1 hour. The powder was charged into a rotating electric furnace (rotary kiln), and kept in oxygen gas (diluted with nitrogen as a carrier gas to 1% by volume) and hydrogen gas (diluted with nitrogen as a carrier gas to 4% by volume) at 900° C. for 1 hour. Thus, an oxygen reduction catalyst being a mixture of niobium oxide and carbon was synthesized.

The same elemental analysis as in Example 1 was performed, and it was confirmed that an oxygen defect was present on niobium oxide. The average particle size was 10 nm from observation by TEM. In addition, a substance in which carbon was partially replaced with nitrogen was highly dispersed on the surface of niobium oxide, and the coverage was about 10%.

Example 23

Ti phthalocyanine was mixed with salicylic acid and a fine carbon fiber powder, and subjected to thermolysis in an electric furnace having an oxygen-free reduction atmosphere at 800° C. for 1 hour. The powder was charged into a rotating electric furnace (rotary kiln), and kept in oxygen gas (diluted with nitrogen as a carrier gas to 1% by volume) and hydrogen gas (diluted with nitrogen as a carrier gas to 4% by volume) at 900° C. for 1 hour. Thus, an oxygen reduction catalyst being a mixture of titanium oxide and carbon was synthesized.

The same elemental analysis as in Example 1 was performed, and it was confirmed that an oxygen defect was present on titanium oxide. The average particle size was 10 nm from observation by TEM. In addition, a substance in which carbon was partially replaced with nitrogen was highly dispersed on the surface of titanium oxide, and the coverage was about 10%.

Example 24

Zr phthalocyanine was dissolved in 1-methyl-2-pyrolidone, and a fine carbon fiber powder was mixed with and dispersed in the solution. A solvent was removed from this mixed liquid using a rotary evaporator to recover a powder. The powder was charged into a rotating electric furnace (rotary kiln), and kept in oxygen gas (diluted with nitrogen as a carrier gas to 1% by volume, and 4% by volume of $H_2O$ added thereto) at 900° C. for 1 hour. Thus, an oxygen reduction catalyst being a mixture of zirconium oxide and carbon was synthesized.

The same elemental analysis as in Example 1 was performed, and it was confirmed that an oxygen defect was present on zirconium oxide. The average particle size was 10 nm from observation by TEM, and the dispersibility was extremely good. In addition, a substance in which carbon was partially replaced with nitrogen was highly dispersed on the surface of zirconium oxide, and the coverage was 10% or less.

Example 25

Ti phthalocyanine was dissolved in 1-methyl-2-pyrolidone, and a fine carbon fiber powder was mixed with and dispersed in the solution. A solvent was removed from this mixed liquid using a rotary evaporator to recover a powder. The powder was subjected to thermolysis in an electric furnace having an oxygen-free reduction atmosphere at 800° C. for 1 hour. Furthermore, the recovered powder, subjected to thermolysis, was charged into a rotating electric furnace (rotary kiln), and kept in oxygen gas (diluted with nitrogen as a carrier gas to 1% by volume) and hydrogen gas (diluted with nitrogen as a carrier gas to 4% by volume) at 900° C. for 1 hour. Thus, an oxygen reduction catalyst being a mixture of titanium oxide and carbon was synthesized.

The same elemental analysis as in Example 1 was performed, and it was confirmed that an oxygen defect was present on titanium oxide. The average particle size was 10 nm from observation by TEM, and the dispersibility was extremely good. In addition, a substance in which carbon was partially replaced with nitrogen was highly dispersed on the surface of titanium oxide, and the coverage was 10% or less.

(Oxygen Reduction Capacity Evaluation)

The oxygen reduction catalysts synthesized in Example 3 to Example 25 were evaluated by performing the single cell test carried out in the oxygen reduction capacity evaluation. Current values at which the outputs of the cell were 0.4 V and 0.2 V were measured. The results are shown in Table 1. It is to be noted that the results in Comparative Example 1 are shown in Table 1 as reference.

TABLE 1

| Example | Catalysts | Current value (A) 0.4 V | Current value (A) 0.2 V |
|---|---|---|---|
| Example 3 | $Ta_2O_5$—$TiO_x$ | 0.45 | 1.26 |
| Example 4 | $Ta_2O_5$—$NbO_x$ | 0.48 | 1.35 |
| Example 5 | $Ta_2O_5$—$NbFeO_x$ | 0.52 | 1.42 |
| Example 6 | $Ta_2O_5$—$TiO_xN_y$ | 0.56 | 1.49 |
| Example 7 | $Ta_2O_5$—$NbO_xN_y$ | 0.61 | 1.53 |
| Example 8 | $Ta_2O_5$—$NbFeO_xN_y$ | 0.75 | 1.62 |
| Example 9 | $Ta_2O_5$—C | 0.62 | 1.54 |
| Example 10 | $Nb_2O_5$—C | 0.58 | 1.47 |
| Example 11 | $Ta_2O_5$—$C_xN_y$ | 0.76 | 1.76 |
| Example 12 | $Nb_2O_5$—$C_xN_y$ | 0.71 | 1.59 |
| Example 13 | $Ta_2O_5$—$FeO_z$—$C_xN_y$ | 0.80 | 1.81 |
| Example 14 | $Nb_2O_5$—$FeO_z$—$C_xN_y$ | 0.76 | 1.69 |
| Example 15 | $TiO_2$—C | 0.47 | 1.13 |
| Example 16 | $ZrO_2$—C | 0.43 | 1.02 |
| Example 17 | $TiO_2$—$FeO_z$—$C_xN_y$ | 0.59 | 1.28 |
| Example 18 | $ZrO_2$—$FeO_z$—$C_xN_y$ | 0.61 | 1.46 |
| Example 19 | $ZrO_2$—$C_xN_y$ | 0.63 | 1.57 |
| Example 20 | $ZrO_2$—$C_xN_y$ | 0.55 | 1.31 |
| Example 21 | $TiO_2$—$C_xN_y$ | 0.48 | 1.30 |
| Example 22 | $Nb_2O_5$—$C_xN_y$ | 0.76 | 1.71 |
| Example 23 | $TiO_2$—$C_xN_y$ | 0.75 | 1.61 |
| Example 24 | $ZrO_2$—$C_xN_y$ | 0.80 | 1.85 |
| Example 25 | $TiO_2$—$C_xN_y$ | 0.81 | 1.85 |
| Comparative Example 1 | $Ta_2O_5$ | 0.18 | 0.98 |

It is considered from the above results that the transition metal oxide to which an oxygen defect is introduced is at least partially covered with the electron conductive substance to thereby enable the electron transfer and the oxygen diffusion property associated with the catalyst reaction to be enhanced. As a result, the catalyst performance of the oxygen reduction catalyst can be enhanced.

As is clear from the above results, the present embodiment can provide a catalyst that has an oxygen reduction performance equal to or better than that of platinum, and that is stable in an acidic solution at a high potential and is inexpensive.

This application claims the priority based on Japanese Patent Application 2011-65846 filed on Mar. 24, 2011, whose disclosure is incorporated herein in its entirety.

The present invention is described in the foregoing with reference to embodiments and examples, but the present invention is not limited to the embodiments and examples. Configurations and details of the present invention can be variously modified within the scope of the present invention to such an extent that can be understood by one skilled in the art.

INDUSTRIAL APPLICABILITY

The oxygen reduction catalyst according to the present embodiment is used for, for example, electrodes of electrochemical devices, in which oxygen serves as an oxidant, such as a fuel cell and an air battery.

What is claimed is:

1. An oxygen reduction catalyst comprising a transition metal oxide particle to which an oxygen defect is introduced, and a layer that is provided on the transition metal oxide particle and that comprises an electron conductive carbon,
   wherein the amount of the oxygen defect in the transition metal oxide particle is 1 to 10 atm %,
   wherein the layer comprising the electron conductive carbon covers 0.1 to 70% of the transition metal oxide particle.

2. The oxygen reduction catalyst according to claim 1, wherein oxygen atoms of the transition metal oxide particle are partially replaced with nitrogen atoms.

3. The oxygen reduction catalyst according to claim 1, wherein a transition metal in the transition metal oxide particle is at least one element selected from the group consisting of Ti, Zr, Nb and Ta.

4. The oxygen reduction catalyst according to claim 1, wherein a transition metal in the transition metal oxide particle is partially replaced with at least one element that is other than the transition metal and that is selected from the group consisting of Ti, V, Cr, Mn, Fe, Co, Zr, Nb, Mo, Ru, Pd, Hf, Ta and W.

5. The oxygen reduction catalyst according to claim 1, wherein the layer comprises at least one element that is other than the transition metal of the transition metal oxide particle and that is selected from the group consisting of Ti, Cr, Mn, Ni, Co, Fe, Cu, Zr, Nb, Mo, Ru, Ta and W.

6. A fuel cell in which the oxygen reduction catalyst according to claim 1 is used for an air electrode.

7. An air battery in which the oxygen reduction catalyst according to claim 1 is used for an air electrode.

8. A method for producing the oxygen reduction catalyst according to claim 1, comprising heating a transition metal carbonitride particle as a starting material in an oxygen and carbon monoxide-containing mixed gas.

9. The oxygen reduction catalyst according to claim 1, wherein the amount of the oxygen defect is 2 to 5 atm %.

10. The oxygen reduction catalyst according to claim 9, wherein the electron conductive carbon is partially replaced with nitrogen.

11. The oxygen reduction catalyst according to claim 1, wherein the layer comprises at least one element selected from the group consisting of Ti, V, Cr, Mn, Fe, Co, Zr, Nb, Mo, Ru, Pd, Hf, Ta and W.

* * * * *

UNITED STATES PATENT AND TRADEMARK OFFICE
CERTIFICATE OF CORRECTION

PATENT NO. : 9,748,580 B2
APPLICATION NO. : 14/005795
DATED : August 29, 2017
INVENTOR(S) : Ota et al.

It is certified that error appears in the above-identified patent and that said Letters Patent is hereby corrected as shown below:

On the Title Page

In Column 2 (item (56)) at Line 37, Under Other Publications, change "cabonitrides" to --carbonitrides--.

In the Specification

In Column 2 at Line 22 (approx.), Change "6400-B406" to --B400-B406--.

In Column 5 at Line 49, Change "oxygen-containing" to --oxygen and carbon monoxide-containing--.

In Column 13 at Lines 28-29 (approx.), Change "pyrolidone," to --pyrrolidone,--.

In Column 13 at Lines 50-51, Change "pyrolidone," to --pyrrolidone,--.

Signed and Sealed this
Twenty-fourth Day of July, 2018

Andrei Iancu
*Director of the United States Patent and Trademark Office*